(12) United States Patent
Patwardhan et al.

(10) Patent No.: US 10,705,756 B2
(45) Date of Patent: Jul. 7, 2020

(54) AGENT AWARE SELECTIVE BACKUP OF A VIRTUAL MACHINE USING VIRTUAL I/O FILTER SNAPSHOTS

(71) Applicant: EMC IP Holding Company LLC, Hopkinton, MA (US)

(72) Inventors: Kedar Patwardhan, Maharashtra (IN); Rajesh Nair, San Jose, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 16/160,341

(22) Filed: Oct. 15, 2018

(65) Prior Publication Data

US 2020/0117365 A1 Apr. 16, 2020

(51) Int. Cl.
*G06F 3/06* (2006.01)
*G06F 11/14* (2006.01)

(52) U.S. Cl.
CPC ............ *G06F 3/065* (2013.01); *G06F 3/0619* (2013.01); *G06F 3/0664* (2013.01); *G06F 3/0673* (2013.01); *G06F 11/1446* (2013.01); *G06F 11/1448* (2013.01); *G06F 11/1451* (2013.01); *G06F 11/1458* (2013.01); *G06F 11/1466* (2013.01)

(58) Field of Classification Search
CPC ...... G06F 3/065; G06F 3/0619; G06F 3/0664; G06F 3/0673; G06F 11/1458; G06F 11/1464; G06F 11/1466; G06F 11/1448; G06F 11/1446; G06F 11/1451; G06F 11/1471

See application file for complete search history.

(56) References Cited

U.S. PATENT DOCUMENTS

| | | | | |
|---|---|---|---|---|
| 9,195,670 | B1* | 11/2015 | Mam | G06F 16/128 |
| 10,061,657 | B1* | 8/2018 | Chopra | G06F 11/1461 |
| 2013/0325828 | A1* | 12/2013 | Larson | G06F 16/2365 |
| | | | | 707/703 |
| 2015/0378636 | A1* | 12/2015 | Yadav | G06F 3/0608 |
| | | | | 711/165 |
| 2018/0276083 | A1* | 9/2018 | Mitkar | G06F 11/1451 |

* cited by examiner

*Primary Examiner* — Glenn Gossage
(74) *Attorney, Agent, or Firm* — Womble Bond Dickinson (US) LLP (57) ABSTRACT

A method includes identifying a state of an application and taking a snapshot of application data. The method continues to generate a virtual filter input/output snapshot from I/O filter records for the snapshot. The filer records are generated by a filter driver that intercepts I/Os between the application and disks that store application data. The method further includes releasing the snapshot, resuming the application and performing a backup using the virtual filter I/O snapshot. Finally, the method triggers the filter driver to replace multiple filter driver records corresponding to the virtual filter I/O snapshot with data indicating the application data was backed up using the virtual filter I/O snapshot.

21 Claims, 6 Drawing Sheets

AGENT AWARE SELECTIVE BACKUP OF A VIRTUAL MACHINE USING VIRTUAL I/O FILTER SNAPSHOTS

TECHNICAL FIELD

This disclosure relates to the field of backing up data of a client or host computer. More specifically, the disclosure relates to performing a more efficient backup of application data.

BACKGROUND

In a computing environment having one or more virtual machines (VMs) on a host, the VMs are most commonly backed up by taking a snapshot of either all blocks on the storage to be backed up (full backup) or the changed blocks on the changed blocks on the storage to be backed up (incremental backup). In the prior art, there are at least two different procedures that deploy a backup agent (or, "application agent") inside a VM for application data backup. One of the procedures uses a backup agent inside a VM to quiesce the application state and takes a snapshot of the application data on one or more production disks. The backup agent then reads the application data to be backed up and streams the application data to a backup storage media. The backup agent deployed inside the VM needs to know the location and credentials for storing and cataloging the backup application data. In the second procedure, an agent deployed inside a VM, quiesces the application state and then requests an external proxy VM to trigger a snapshot of the application data on the one or more production disks. The external proxy VM then carries out backup by triggering the snapshot of the application data on the one or more production disks.

There are several problems with the backup solutions in the prior art. An application agent inside a VM often quiesces the application state by triggering a snapshot using a volume snapshot service (VSS). Triggering the VSS starts a timer to delete the VSS snapshot and resume the application within a specified period of time, which is kept fairly short so as not to impact end-user performance. Once the VSS snapshot has been taken and the application quiesced, the application agent reaches out to the proxy VM to perform the backup. The proxy VM then takes its own snapshot of the application data on the production disks, so that the application agent can release the VSS snapshot and resume the application. If the application agent does not receive any response from the proxy VM within the application-specified period of time (such as, due to existing load on the host or a pre-existing number of snapshots being taken on the production disks), the proxy VM responds to the application agent with a failure, and the application agent removes the VSS snapshot, resumes the application, and tries again to initiate the backup. If the proxy VM managed to create the snapshot of the application data on the production disks, but took longer than the application-specific time to do so, then the application agent times out, removes the VSS snapshot, resumes the application and, again, tries to initiate the backup. If the proxy VM managed to create backup of the application data on the production disks, and responds back to the application agent within the application-specified time, then the application agent removes the VSS snapshot that it created, resumes the application, and the backup agent considers that its part of the backup process is complete. Even though the assumption of completion is the most typical outcome, the overall process requires expensive snapshots of the production disks and is not free of failure.

The methods of the prior art are dependent upon timing to indicate success of the backup process. As is common with any algorithm that is dependent on timing considerations for its success, a failure of the proxy VM or an overloaded storage subsystem can potentially cause an application agent to retry initiating the backup process, leading to application performance degradation due to repeated quiesce/resume events. Further, the application agent needs to be aware of all credentials of all proxy VMs that it needs to reach out to, to complete the backup. The proxy VMs need to trigger snapshots of application data on the production disks, which have a performance overhead of their own. If an application agent is designed to reach out to multiple proxy VMs, it needs to ensure only one proxy VM process takes over the backup process. In the prior art, there exists an opportunity for a user in the application VM to launch attacks on the proxy VM and then other components of the backup system.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

In the following detailed description of embodiments, reference is made to the accompanying drawings in which like references indicate similar elements, and in which is shown by way of illustration manners in which specific embodiments may be practiced. These embodiments are described in sufficient detail to enable those of ordinary skill in the art to practice the invention, and it is to be understood that other embodiments may be utilized and that logical, mechanical, electrical, functional and other changes may be made without departing from the scope of the present disclosure. The following detailed description is, therefore, not to be taken in a limiting sense, and the scope of the present invention is defined only by the appended claims.

In a first embodiment, a method of backing up application data uses a combination of snapshot tools to perform a backup. The first of two tools is a conventional snapshot taken of the production disks where the application data is stored. This snapshot is stored on the production disks. The second tool uses an I/O filter driver to generate a virtual snapshot from I/O filter driver records. A primary task of the I/O filter driver is intercepting every I/O (read/write) to, and from, the production disks. The I/O filter driver generates a filter driver record of each intercepted I/O and stores the filter driver records in a staging area, on mirror disks rather than the production disks. The filter I/O driver can also commit "write" I/O's to the mirror disks at a configurable time, and also commit these same I/O's to production disk(s) at a configurable time. In contrast, when a production disk snapshot is taken, the production disks must intercept and process I/O's that write to tracked dirty blocks that have not been backed up yet. Intercepting and processing I/O's to the production disks during a backup can negatively impact user performance. Thus, in Applicant's claimed solutions, the production snapshot is taken, used to verify a VFIO snapshot, then the production snapshot is discarded and the backup is performed using the VFIO snapshot.

In a typical backup, the backup to be performed is only concerned with a subset of all of the intercepted I/O's on a system, such as I/O's during a defined window of time, for a particular application, and possibly also for a defined set of uses. These backup parameters are determined by a backup policy. The backup policy can specify that data of a particular set of users is to be backed up for a particular application, at a specified frequency (e.g. every 6 hours), for a specified type of the backup (incremental vs. full), and backed up to a certain tier of storage, having a guaranteed available and access speed. Collectively, these backup parameters are specified in a "service level agreement" (SLA) and implemented in a backup policy. For example, a backup policy may specify that application data for an accounting department of a particular company is to be backed up. The policy may further specify that application data for "XYZ Accounting Software" data is to be backed up incrementally every 6 hours and with a full backup every Friday night at 10 p.m. The policy may further specify that data is to be stored in tier 2 storage (e.g. cloud storage), accessible within an identified period of time and at a specified data transfer rate.

The backup policy, above, can be used to configure the I/O Filter Driver to tag I/O's that match the backup policy with a unique identifier so that a virtual file I/O (VFIO) snapshot of the I/O's can be readily identified, for a specific window of time. A conventional snapshot of production disks can also be taken for the same time period. The VFIO snapshot and production snapshot can be verified against each other, so that the production snapshot can be released, and the VFIO snapshot can be kept and used to perform the backups. Since the I/O Filter Driver intercepts all I/O's, and commits those I/O's in a mirrored disk storage, using the VFIO snapshot to perform the backup does not incur the same overhead as a conventional snapshot of the production disks.

After a VFIO snapshot has been taken and verified against the conventional snapshot, the conventional snapshot can then be released. The I/O Filter Driver can then contact a virtual machine backup proxy to perform a backup of the relevant data using the VFIO snapshot. The virtual machine backup proxy can reside on the same host as is being backed up, or the virtual backup proxy can be located on a separate host or on a backup server.

The VFIO snapshot contains a list of the changed blocks that are to be backed up by the backup proxy to a target storage. After the backup completes, the just-completed backup now becomes a "previous backup." As a post-backup process, the target storage can be accessed to obtain a list of changed blocks actually backed up to the target storage. The list of changed blocks can be used to replace filter I/O records with the list of changed blocks. The list of changed blocks requires substantially less storage than the equivalent I/O filter driver records.

At the beginning of a new backup, in response to a backup request, an application agent can quiesce the state of an application having application data that is to be backed up. When quiescing the application, a Volume Snapshot Service (VSS) can stop the application and take an application-consistent snapshot of the application pending I/O's and memory. The application agent can then trigger a conventional snapshot of the production disks. The application agent can then request and obtain a VFIO snapshot, based on filter records generated and stored by the I/O Filter Driver intercepting I/O's, the I/O Filter Driver configured in accordance with a backup policy. The application agent can then trigger release of the snapshot of the production disks, release the VSS snapshot, and resume the application. The filter I/O driver can then contact a backup proxy to perform the backup using the VFIO snapshot. After the backup is completed, one or more filter driver records, that were used to create the VFIO snapshot, can be flushed and replaced with a list of backed up data blocks indicating the changed blocks that were backed up to the target storage, the list of changed blocks being of smaller data size than the filter I/O records being flushed and replaced.

In an embodiment, the application agent can configure the filter driver to generate the I/O filter records in accordance with a frequency specified in a backup policy related to the application data. In an embodiment, generating the VFIO snapshot comprises comparing, by the application agent, changed blocks in the production disk snapshot to filter driver data representing a previous backup, to determine a list of changed application data blocks in the snapshot that have changed since the previous backup. In an embodiment, the application agent communicates with the filter driver via a secure communication channel. In an embodiment, the application agent causes the filter driver to store the VFIO snapshot on different disks (mirror disks) than the production disks being backed up.

Any of the above functionality can be embodied on a non-transitory computer-readable medium programmed with executable instructions that, when executed by a processing device, causes the processing device to perform the method. A system can be programmed with executable instructions that, when executed by a processing system that includes at least one hardware processor, can perform any of the above methods.

Some embodiments include one or more application programming interfaces (APIs) in an environment with calling program code interacting with other program code being called through the one or more interfaces. Various function calls, messages or other types of invocations, which further may include various kinds of parameters, can be transferred via the APIs between the calling program and the code being called. In addition, an API may provide the calling program code the ability to use data types or classes defined in the API and implemented in the called program code. At least certain embodiments include an environment with a calling software component interacting with a called software component through an API. A method for operating through an API in this environment includes transferring one or more function calls, messages, other types of invocations or parameters via the API.

Figure 1:
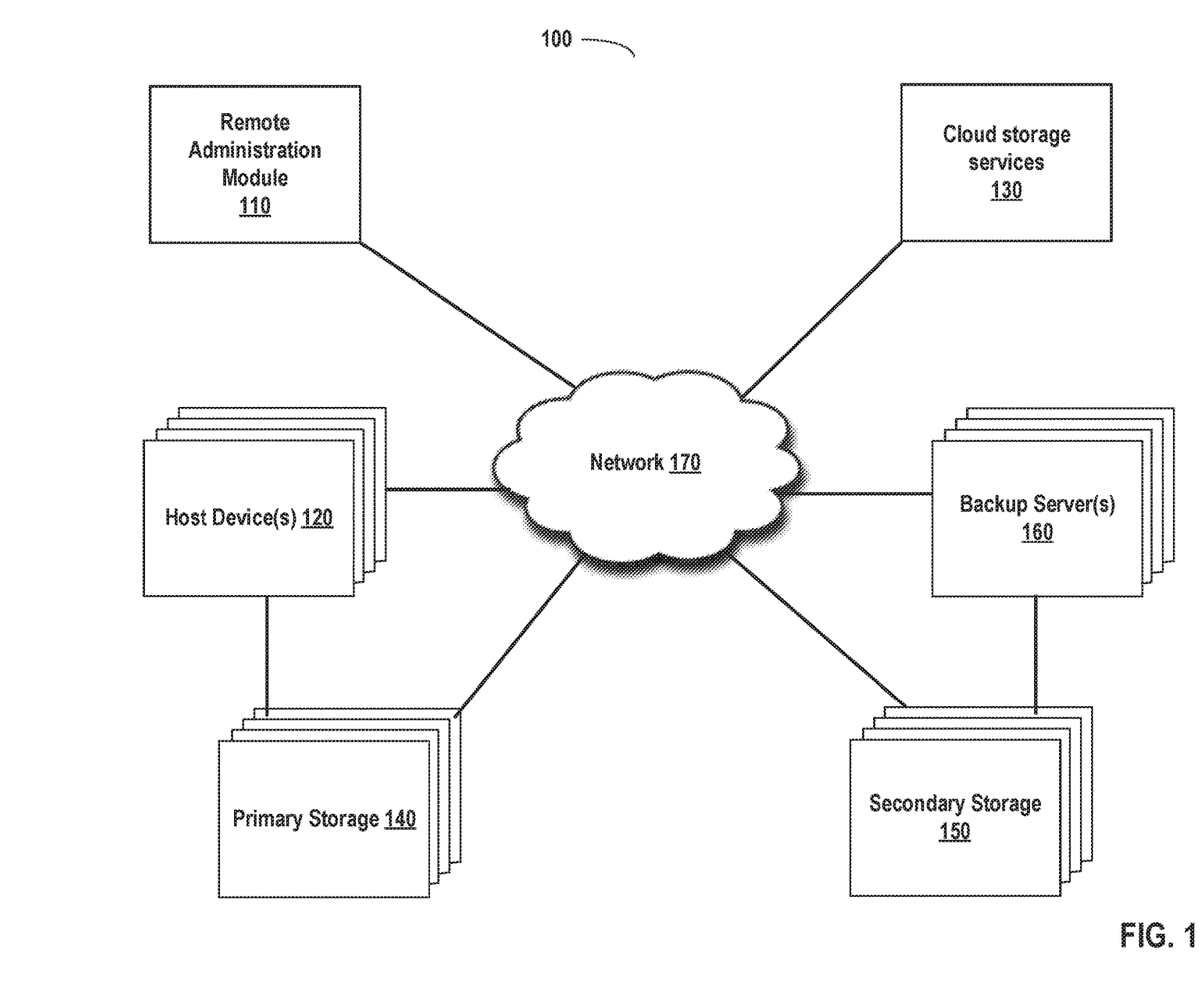
FIG. 1 illustrates, in block diagram form, an overview of a computing infrastructure that can perform agent aware selective backup of a virtual machine (VM) using virtual filter I/O snapshots (VFIO snapshots), in accordance with some embodiments.

FIG. 1 illustrates, in block diagram form, an overview of a computing infrastructure 100 that can perform agent aware selective backup of a virtual machine (VM) using virtual filter I/O (VFIO) snapshots, in accordance with some embodiments.

The computing infrastructure 100 that can perform agent aware selective backup of a VM using VFIO snapshots, as shown in FIG. 1, includes one or more host devices 120, a primary storage device 140, and a secondary (or "target") storage device 150. Primary storage 140 and secondary storage 150 may be collectively termed "storage appliances." The computing infrastructure 100 can also include one or more cloud storage services 130, and one or more backup servers 160 coupled to a network 170. A remote administration module 110 can also be coupled to the one or more host devices 120, the storage appliance(s) 140 and 150, and the backup server 160 via network 170. Host devices 120, storage appliance(s) 140 and 150, backup servers 160, and remote administration module 110 can also be coupled to a one or more cloud storage services 130 which can act as a secondary storage 150. Host devices 120 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Alternatively, any of host devices 120 may be a primary storage system (e.g., local data center) that provides storage to other local clients, which may periodically back up the content stored therein to a backup storage system (e.g., a disaster recovery site or system), such as backup server 160 or secondary storage system 150. Network 170 may be any type of network such as a local area network (LAN), a wide area network (WAN) such as the Internet, a fiber network, a storage network, or a combination thereof, wired or wireless. Components of an example host device 120 can be as described with reference to FIG. 2 and FIG. 6, below.

Host devices 120 can backup or restore one or more application data sets of a virtual machine (VM) on the host devices 120 to, or from, the backup server 160. A virtual machine on host device 120 can include a backup application agent, an input/output (I/O) filter framework, an I/O filter driver, and a hypervisor, all of which can communicate with a backup application on backup server 160, to facilitate efficient backups of application data on one or more VM's. Backup server 160 can, in turn, opt to store all or a portion of the backed up application data sets to cloud storage 130 or to secondary storage 150. Applications can be e.g., SAP, DB2, SQL Server, Exchange, Sharepoint®, Microsoft® Exchange®, or other application. An application can have its own backup component that facilitates backup of the application to secondary storage 150, backup server 160, or a cloud storage 130. The backup component can have a backup application programming interface (API) that can be called to invoke a backup of the application data set and/or to return metrics about a backup of the application data set.

A primary storage 140 can comprise a large number of disks, such as EMC® VMAX 400K with up to 5,760 hard drives. In an embodiment, one or more primary storages 140 can form a part of a host device 120. In an embodiment, a virtual disk can be a raw virtual disk mapped to a one or more portions of storage. A portion of storage can comprise one or more logical unit numbers (LUNs) of a single physical disk or one or more physical disks in a primary storage 140. In an embodiment, a raw disk can be configured to use virtual mapping to one or more portions of storage, such that the one or more portions of storage can be snapshot before a backup. In an embodiment, a raw virtual disk can be physically mapped to one or more portions of storage.

A primary storage 140 can include an area set aside for I/O filter storage, to facilitate generating virtual filter I/O (VFIO) snapshots from I/O filter records. In an embodiment, filter storage can be provisioned on separate disks from production storage so that during a backup, production disk performance is minimally affected, if at all. An I/O filter driver in the kernel of a host device 120 can be configured to intercept every I/O to/from the production disks of primary storage 140. In an embodiment, the I/O filter driver can be configured to stage certain I/O's, e.g. between an application and the production disks of primary storage 140, and to stage filter driver records associated with the certain I/O's in association with a unique identifying number. The I/O filter driver can be configured for how long each intercepted I/O should be held pending, when it should be committed to mirrored, staging area storage, and when it should be committed to production disks. The configuration of the I/O filter driver can be in accordance with a backup policy.

A backup of a client application data set from a primary storage 140 to a secondary storage 150, or to backup server 160, can be initiated by a user of the client, a remote administrator 110, or by a backup policy on backup server 160. In an embodiment, scheduled backups can be initiated by backup server 160. In an embodiment, the backup can be initiated by a backup application on backup server 160, or by a backup proxy on another machine. For example, a backup proxy can be implemented on as a virtual machine on a host machine. Backup server 160 can initiate a backup or restore of a client application data set on host device 120 in accordance with one or more backup policies each associated with a client and an application on the host device 120. For example, a policy for a virtual machine on host device 120 can be that a full backup of a Microsoft® Sharepoint® database is performed every Friday evening.

Figure 2:
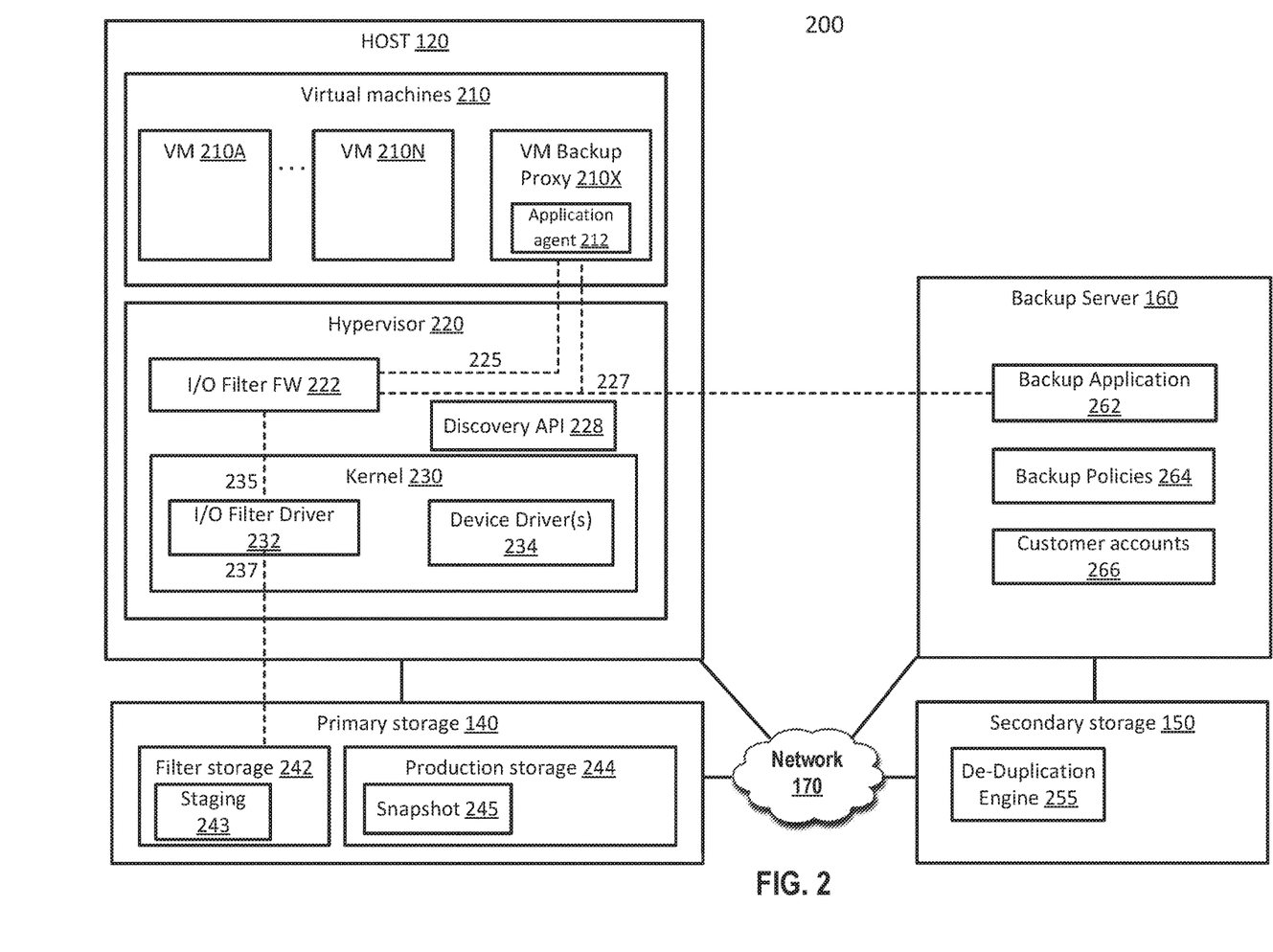
FIG. 2 illustrates, in block diagram form, a detailed view of a computing infrastructure that can perform agent aware selective backup of a virtual machine using virtual filter I/O snapshots, in accordance with some embodiments.

FIG. 2 illustrates, in block diagram form, a detailed view of a computing infrastructure 200 that can perform agent aware selective backup of a virtual machine (VM) using virtual filter I/O snapshots (VFIO snapshots), in accordance with some embodiments.

A virtual infrastructure 200 can include one or more host computing systems ("host 200"), a backup server 160, a primary storage 140, and a secondary storage 150. In an embodiment, these components can be communicatively interconnected via network 170. Host 120 can have a plurality of virtual machines 210, including VM 210A through VM 210N. In an embodiment, VMs 210 can include a backup proxy 210X implemented as a VM. VM backup proxy 210X can further include an application agent 212 that facilitates implementing the functionality described herein.

Network 170 can be any type of network such as a local area network (LAN), a wide area network (WAN) such as the Internet, a corporate intranet, a metropolitan area network (MAN), a storage area network (SAN), a bus, or a combination thereof, as well as wired and/or wireless networks.

A client having an application with an application data set to be backed up can be host 120 or a virtual machine 210 on the host 120 (interchangeably, "client"). A host 120 can include physical hardware (not shown), a virtual machine manager or "hypervisor" 220, one or more virtual machines (VMs) 210, or one or more VM backup proxies (VPs) 210X.

Physical hardware (not shown) can include a physical basic input-output system (BIOS), one or more physical disks or storage devices, one or more network interface cards (NICs), memory, and one or more hardware processors or central processing units (CPUs). Host 200 can be implemented in accordance with the computing system described with reference to FIG. 6, below.

Host 120 can include hypervisor 220 that provides a virtualization abstraction layer to support one or more virtual machines (VMs) 210 on host 200. Host 120 can further include virtual hardware (not shown) that can correspond to physical hardware (not shown), such as a virtual BIOS, one or more virtual storage devices (VDISK), one or more virtual network interface cards (VNICs), virtual memory, and one or more virtual processors or CPUs.

Hypervisor 220 can include an I/O Filter Framework (FW) 222, an operating system kernel 230, an I/O Filter Driver 232, and one or more device drivers 234. I/O Filter FW 222 is interfaced to an application agent 212 in VM backup proxy 210X via communication channel 225. I/O Filter FW 222 is also interfaced to I/O Filter Driver 232 in kernel 230 via communications channel 235. Application agent 212 can receive communications from I/O Filter FW 222 and backup application 262, via communication channel 227. Any of communication channels 225, 227, 235, and 237 can be implemented using function calls to/from a framework or application programming interface, interprocess communication, communication by interrupts and mailboxes, and the like. I/O Filter FW 222 can be implemented as a software framework that makes calls to I/O Filter Driver 232 to implement the functionality exposed by I/O Filter FW 222. Kernel 230 can perform operating system functions that support virtualization in hypervisor 220, perform input/output using the one or more device drivers 234, and other operating system services. One or more device drivers 234 in kernel 230 can be used to interface the hypervisor 220 to connected hardware (not shown).

VM backup proxy 210X can include an application agent 212. Application agent 212 can receive a backup policy 264 from backup server 160 via backup application 262. The backup policy 264 can indicate a frequency of backup, type of backup, the application data whose data is to be backed up, and other backup parameters. Application agent 212 can configure the operation of I/O filter driver 232 and other backup functionality using the backup policy 264. For example, backup policy 264 can state, "for this client, for application Microsoft® Exchange®, perform a full backup once per week, perform an incremental backup every 6 hours, and backup the application data to cloud storage." Applicant agent 212 can call I/O Filter FW 222, via communication channel 225, to configure I/O Filter Driver 232 to identify and capture filter records for Microsoft® Exchange® in 6 hour increments.

In response to a request, e.g. from backup application 262, to perform a backup in accordance with a backup policy 264, application agent 212 can quiesce the state of the application, e.g. Microsoft® Exchange®, and cause a volume snapshot service (VSS) snapshot to be taken of a Microsoft® Exchange® application data state. The VSS snapshot records the application data state even while the application is in use. A VSS snapshot is a read-only point-in-time copy of a volume. VSS snapshots allow the creation of consistent backups of a volume, ensuring that the contents do not change and are not locked while the backup is being made.

The VSS snapshot can be a part of quiescing the application state. However, the application state can only be quiesced for a limited period of time which is much shorter than the time it takes to move the application data to secondary storage 250. Application agent 212 can also cause VM backup proxy 210X to take snapshot 245 of the application data on the production storage 244. Snapshot 245 is stored on the same production disks 244 that store the application data for which the snapshot 245 was taken. Applicant agent 212 can trigger I/O filter driver 232 to generate a virtual filter I/O (VFIO) snapshot of I/O filter driver records matching the backup policy. Applicant agent 212 can ensure that the virtual filter I/O (VFIO) snapshot and the snapshot 245 are co-extensive. In an embodiment, filter storage 242 can be on different disks ("mirror disks") than the production storage 244 disks. After the virtual snapshot is generated, and application agent 212 has been notified that the virtual snapshot has been generated, then application agent 212 can resume the application.

Hypervisor 220 can further include an application discovery application programming interface (API) 228 that can discover one or more applications that run on the VM 210. Each application can include a backup API that interfaces to the application data generated by the application. Backup API also accesses metadata about application data that has been backed up, or is ready to be backed up. Metadata can indicate a current size of the application data set, a percentage of the application data set that has changed since a last backup, a number of inputs and outputs (I/O's) performed on the data set since the last backup, and other information about one or more backups of the application data set.

In an embodiment, host 120 can further include a storage manager or storage controller (not shown) configured to manage storage resources of host 120, such as, for example, storage space and processing resources (e.g., processor, memory, network resources). The storage manager or controller may be accessed by a remote administration module 110 (as shown in FIG. 1) remotely via a management or configuration interface (not shown). The remote administrator can provision and manage storage resources based on a set of policies, rules, and/or service level agreements. The storage resources may be virtualized into a pool of virtual storage resources, where underlying physical storage resources represented by the corresponding virtual storage resources may be implemented locally, remotely (e.g., hosted by another storage system), or both. The virtual storage resources can be provisioned, allocated, and/or defined by an administrator or automatically by the storage manager based on a set of software-defined policies. The virtual storage resources may be represented in one or more virtual machines 210 (e.g., virtual storage systems) managed by a hypervisor 220. Each of the virtual machines can be provisioned to provide a particular type of storage service (e.g., file-based, block-based, object-based, or Hadoop Distributed File System) to a client based on a storage policy or service level agreement associated with that particular client as part of software-defined storage services.

Primary storage 140 can include any type of server or cluster of servers. For example, primary storage 140 may be a storage server used for any of various different purposes, such as to provide multiple users with access to shared data and/or to back up mission critical data. Primary storage 140 may be, for example, a file server (e.g., an appliance used to provide network attached storage (NAS) capability), a block-based storage server (e.g., used to provide SAN capability), a unified storage device (e.g., one which combines NAS and SAN capabilities), a near-line storage device, a direct attached storage (DAS) device, or essentially any other type of data storage device. Primary storage 140 may have a distributed architecture, or all of its components may be integrated into a single unit. Primary storage 140 may be implemented as part of a primary storage available from EMC® Corporation of Hopkinton, Mass., such as the EMC® VMAX family of storage appliances.

Primary storage 140 can include a plurality of storage units (not shown) which may interconnected inside the primary storage, or as a backplane, via a bus and/or a network. Storage units can be, for example, conventional magnetic disks, optical disks such as compact disc-read only memory (CD-ROM) or digital versatile disk (DVD) based storage, magnetic tape storage, magneto-optical (MO) storage media, solid state disks (SSDs), flash memory based devices, or any other type of non-volatile storage devices suitable for storing large volumes of data. Storage units may also be combinations of such devices. In the case of disk storage media, the storage units may be organized into one or more Redundant Array of Inexpensive Disks (RAID) volumes.

Primary storage 140 can further includes raw disk mapping files that map a virtual disk of a virtual machine 210 to one or more portions of storage on the primary storage 140. A portion of a primary storage 140 can be a logical unit number (LUN). Raw disk mapping to one or more portions of storage can be a physical mapping or a virtual mapping. Primary storage 140 can be coupled to backup server 160 and/or secondary storage 150 via network 170.

Secondary storage 150 can be coupled to backup server 160 either as direct attached storage (DAS) or as network attached storage (NAS) via network 120. Secondary storage 150 may include any type of server or cluster of servers. For example, secondary storage 150 may be a storage server used for any of various different purposes, such as to provide multiple users with access to shared data and/or to back up mission critical data. Secondary storage 150 may be, for example, a file server (e.g., an appliance used to provide NAS capability), a block-based storage server (e.g., used to provide SAN capability), a unified storage device (e.g., one which combines NAS and SAN capabilities), a near-line storage device, a direct attached storage (DAS) device, a tape backup device, or essentially any other type of data storage device. Secondary storage 150 may have a distributed architecture, or all of its components may be integrated into a single unit. Secondary storage 150 may be implemented as part of an archive and/or backup storage system, such as a de-duplication storage system available from EMC® Corporation of Hopkinton, Mass.

Secondary storage 150 can include, but is not limited to, deduplication storage engine 255, and one or more storage units (not shown) communicatively coupled to each other. Storage units may be implemented locally (e.g., single node operating environment) or remotely (e.g., multi-node operating environment) via a bus and/or a network. Storage units can be, for example, conventional magnetic disks, optical disks such as CD-ROM or DVD based storage, magnetic tape storage, magneto-optical (MO) storage media, SSDs, flash memory based devices, or any other type of non-volatile storage devices suitable for storing large volumes of data. Storage units may also be combinations of such devices. In the case of disk storage media, the storage units may be organized into one or more Redundant Array of Inexpensive Disks (RAID) volumes. Note that in one embodiment, backup server 160 and secondary storage 150 are integrated into one single system.

Optional deduplication storage engine 255 is configured to segment data files into multiple segments according to a variety of segmentation policies or rules. Deduplication storage engine 255 only stores a segment in a storage unit if the segment has not been previously stored in the storage unit. In the event that a segment has been previously stored, metadata about the segment is stored enabling the reconstruction of a file using the previously stored segment. As a result, segments of data files are stored in a deduplicated manner, either within each of storage units or across at least some of the storage units. Data stored in the storage units may be stored in a compressed form (e.g., lossless compression: Huffman coding, Lempel-Ziv Welch coding; delta encoding: a reference to a segment plus a difference; subsegmenting: a list of subsegments or references to subsegments, etc.). In one embodiment, different storage units may use different compression methods (e.g., main or active storage units from other storage units, one storage unit from another storage unit, etc.).

Backup server 160 can be a computing system as described with reference to FIG. 6, below. Backup server 160 can comprise one or more computing systems. Backup server 160 can include, but is not limited to, a backup application 262, one or more policies 264, and one or more customer accounts 266. Customer accounts 266 can store service level agreement (SLA) data for one or more customers. Backup policies 264 can contain an SLA for particular users or groups of users of the customer that specifies how often certain application data is to be backed up, the type of the backup to perform (incremental or full), and the tier of storage where the backup data is to be stored. A tier of storage can be, e.g., tier 1 storage having fast access, tier 2 storage, e.g. cloud storage, which may be deduplicated and travel across a network for access, or tier 3 storage, e.g. long term storage which may comprise tapes, read-only disks, or other slower storage devices.

A backup server 160 operating as a storage system may include or represent any type of servers or a cluster of one or more servers (e.g., cloud servers 130). For example, storage system 160 may be a storage server used for various different purposes, such as to provide multiple users or client systems with access to shared data and/or to back up (or restore) data (e.g., mission critical data). Backup server 160 may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc. Storage system 104 may further provide storage services via an object-based protocol and Hadoop distributed file system (HDFS) protocol.

Backup application 262 can invoke logic in application agent 212 to discover the applications that may be installed and/or running on VM 210. Applicant agent can call one or more application programming interfaces on hypervisor 220 to determine changes to application data since a last backup.

Backup server 160 can coordinate with primary storage 140, secondary storage 150, and host 120 to run various backup operations. Backup application 262 may perform both backup and restore functions, invoke discovery APIs within hypervisor 220, and within VMs 210. Backup application 262 can read and write backup accounts 266 and backup policies 264 on backup server 160, or across multiple storage devices accessible to backup server 160.

Customer accounts 266 can store identifying information about a particular client, such as a textual name, a network address, a universally unique client identifier (UUID), and biographic information about the individual and/or company that owns the client. Customer accounts 266 can include login information to backup server 160 for users of virtual machines 210 and administrators who may access backup server 160 via remote administration module 110. Customer accounts 266 can be aggregated by company, by region, or other metric, such that backup policies 264 can be generated for one or more customer accounts 266 by company, by region, or other metric, such as by data center or business operating group.

Backup policies 264 can include, for each application on a client, a backup policy including a backup policy type (by application, by I/O change rate, by user rule) and a protection level for the application data. A protection level can indicate a frequency that application data should be backed up. A protection level can have a textual name to indicate a frequency or range of frequencies for backup. For example, platinum protection level may indicate a backup every 15 minutes and bronze protection level may indicate a backup once each day for a particular application on a client/VM 210. Backup policies 264 can specify particular applications whose data gets backed up from a virtual machine 210, retention policy for the backed up data, whether the backups are incremental, full, image, or an alternating or interleaved combination of these. Backup policies 264 can further define whether data is deduplicated before storage, how quickly the storage can be retrieved for access by a virtual machine, and other policy parameters.

Figure 3:
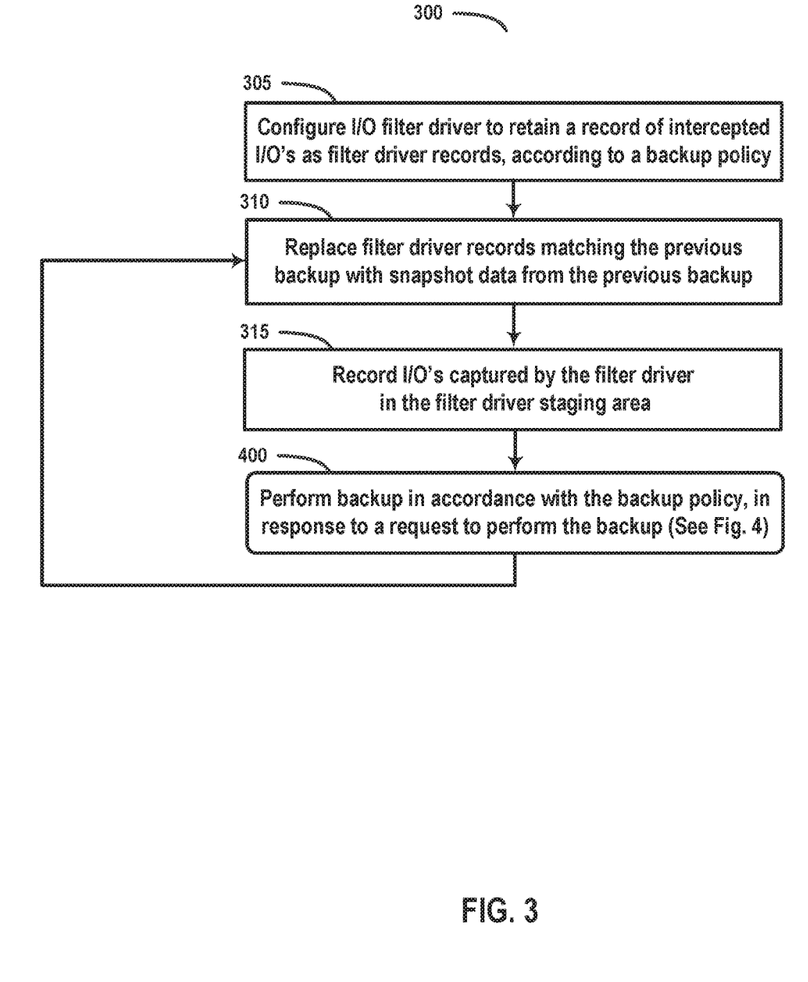
FIG. 3 illustrates, in block diagram form, a method of performing agent aware selective backup of a virtual machine using virtual filter I/O snapshots, in accordance with some embodiments.

FIG. 3 illustrates, in block diagram form, a method 300 of performing agent aware selective backup of a virtual machine (VM) using virtual filter I/O snapshots (VFIO snapshots), in accordance with some embodiments. Method 300 is a top level overview of a backup process that includes (1) configuring the I/O filter driver to generate filter driver records in accordance with a backup policy, replacing filter driver records corresponding to a previous backup with snapshot data from the previous backup, generating filter driver I/O's in accordance with the backup policy, then performing the backup utilizing the filter driver records.

In operation 305, application agent 212 of VM backup proxy 210X receives a backup policy 264 from backup application 262 of backup server 160. Applicant agent 212 can make one or more calls to I/O Filter FW 222 to configure I/O Filter Driver 232 to intercept I/O's from an application, generate a filter driver record of each intercepted I/O, and retain such filter driver records for a period of time specified in the backup policy 264. The filter driver records are stored in association with a unique identifier ("magic number sequence"). For example, I/O Filter Driver 232 can be configured to intercept I/O's from Microsoft® Sharepoint® for every 6 hour period, generate filter driver records for the intercepted I/O's, and store the filter records in association with the unique identifier. In an embodiment, the unique identifier number is a "magic number sequence" of, e.g. 16 bytes.

In operation 310, application agent 212 can make one or more calls to I/O Filter FW 222 to cause I/O Filter Driver 232 to replace one or more filter driver records matching a previous backup of application data with snapshot data from the previous backup. Snapshot data of the previous backup is readily available to backup application 262, by accessing previous backup data on secondary storage 150. The previous backup snapshot data can be transmitted from the backup application 262 to the I/O filter driver 232, via hypervisor 220 communication channel 227, making one or more calls to I/O Filter FW 222. The changed block tracking data of the previous backup is smaller sized than the equivalent filter driver records being replaced. Thus, replacing filter driver records with previous backup snapshot data recovers resources in the I/O filter storage 242, and provides an accurate baseline of the changed blocks from the previous backup.

In operation 315, I/O Filter Driver 232 intercepts I/O's from the application in accordance with the backup policy and generates filter driver records for the intercepted I/Os. For example, an I/O filter driver record may include the unique number associated with the particular, e.g., 6 hour increment for backups as stated in the backup policy, and can also include identifying information about the particular block being accessed, whether the access is read or write, and if a write, whether the data in the block has changed. I/O filter driver records may further include an indication of the policy governing the creation of the records, the application that generated data tracked by the filter driver record, and version information of the application. More, or fewer, fields can be used in the I/O filter driver records. Some of the foregoing information may be tracked as a header record that is applied to all filter records having the unique identifier for this, e.g., 6 hour period.

In operation 400, a backup can be performed, in accordance with the backup policy, and using the I/O filter driver records generated in accordance with the policy in operation 315, in response to a request to perform the backup. Operation 400 is described in further detail, below, with reference to FIG. 4.

Figure 4:
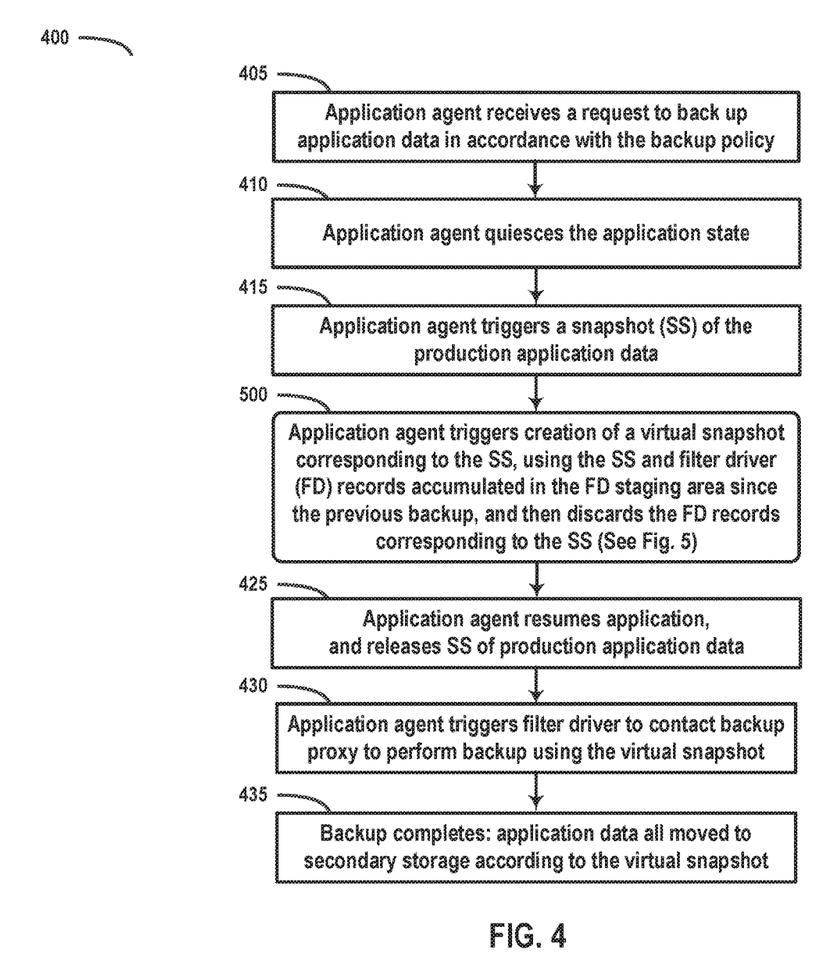
FIG. 4 illustrates, in block diagram form, another method of performing agent aware selective backup of a virtual machine using virtual filter I/O snapshots, in accordance with some embodiments.

FIG. 4 illustrates, in block diagram form, a method 400 of performing agent aware selective backup of a virtual machine (VM) using virtual filter I/O snapshots (VFIO snapshots), in accordance with some embodiments. In an embodiment, method 400 is called from method 300, described above with reference to FIG. 3.

In operation 405, an application agent 212 receives a request to perform a backup of application data of a VM 210 in accordance with a backup policy 264. The backup policy 264 is substantially the same backup policy that was used to configure the I/O filter driver 232 in operation 305 of method 300, described above with reference to FIG. 3.

In operation 410, application agent 212 quiesces the application state of the application whose data is being backed up. Application agent 212 can quiesce the application state by making one or more calls to hypervisor 220, or to an application-specific agent in hypervisor 220, to halt the application. Applicant agent 212 can also make one or more calls to hypervisor 220 to take a volume snapshot service (VSS) snapshot of the application in the quiesced state of the application. The VSS snapshot may include memory, as wells as disk data, representing an application-consistent state of the application at the time the application was stopped (quiesced). In an embodiment, a timer is set indicating a period of time, e.g. 50 milliseconds (ms) to 1 second, that the application can be stopped.

In operation 415, application agent 212 can make one or more calls to hypervisor 220 to cause a snapshot 245 of the production storage 244 for the application data to be backed up. The snapshot is stored as SS 245 in production storage 244 of primary storage 240. The application is still stopped.

In operation 500, application agent 212 triggers creation of a virtual filter I/O (VFIO) snapshot corresponding to SS 245, using the SS 245 and I/O filter driver records generated for application data to be backed up, and accumulated in the I/O filter driver record staging 243 area over the last "X" (e.g. 6) hours of time, in accordance with the backup policy 310 that is governing the backup. In operation 500, the VFIO snapshot created from the I/O filter driver records is compared with the SS 245 taken of the production data disks 244 for the application data, to ensure that the VFIO snapshot represents all of the changed blocks represented in the SS 245. The application agent 212 may then discard the I/O filter driver records corresponding to the SS 245. Details of operation 500 are described below with reference to FIG. 5.

In operation 425, application agent 212 can resume the application, i.e., start the application running again, release the VSS snapshot, and release the SS 245.

In operation 430, application agent 212 causes I/O Filter Driver 232 to contact VM backup proxy 210X to perform the backup of the application data represented in the VFIO snapshot generated from filter driver records in operation 500, above, in accordance with the backup policy 264. Application agent 212 can make one or more calls to I/O Filter Driver FW 222 via interface that cause the I/O Filter Driver FW 222 to instruct an I/O Filter Driver 232, via communication channel 235, to contact the VM Backup Proxy to perform the backup. I/O Filter Driver 234 uses the VFIO snapshot to perform the backup.

In operation 435, backup method 400 completes. All application data is moved to secondary storage according to the virtual snapshot. In an embodiment wherein method 400 is called from method 300, method 400 returns to method 300, and resumes at operation 310.

Figure 5:
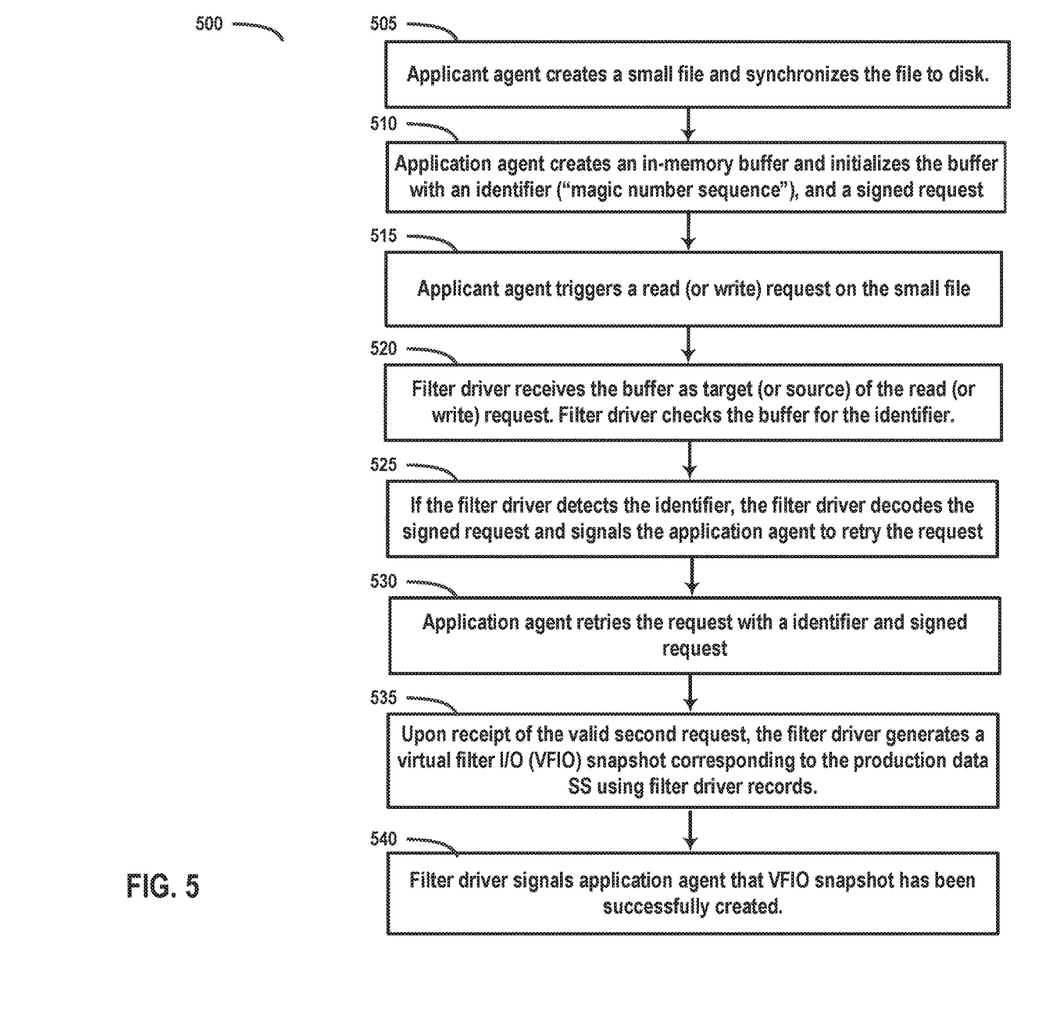
FIG. 5 illustrates, in block diagram form, a portion of a method of performing agent aware selective backup of a virtual machine using virtual filter I/O snapshots, in accordance with some embodiments.

FIG. 5 illustrates, in block diagram form, a portion of a method 500 of performing agent aware selective backup of a virtual machine (VM) using virtual filter I/O snapshots (VFIO snapshots), in accordance with some embodiments. A VFIO snapshot is a snapshot of disk blocks that have changed since a previous backup. The VFIO snapshot is based upon I/O Filter Driver's 232 records of reads and writes since the previous backup. As described above, in operation 305 of method 300, the I/O Filter Driver 232 is configured to generate an I/O filter driver record of every I/O that meets the requirements set forth in the backup policy 264 that was used to configure the I/O Filter Driver 232, and to associate these I/O filter driver records with a unique identifier ("magic number sequence") assigned by the application agent 212 at the time the I/O Filter Driver 232 was configured.

In an embodiment, method 500 is called from method 400, which is a backup process. Method 500 is a process by which application agent 212 instructs the I/O Filter Driver 232 to take a VFIO snapshot using filter driver records.

In operation 505, application agent 212 creates a small file and synchronizes the file to disk.

In operation 510, application agent 212 creates an in-memory buffer and initializes the buffer with an identifier (e.g. a "magic number sequence"), and a signed request to the I/O Filter Driver 232 to generate a VFIO snapshot using filter driver records. In an embodiment the magic number sequence is a unique 16 byte sequence.

In operation 515, application agent 212 triggers a read (or write) request on the small file by reading from, or writing to, the file.

In operation 520, I/O Filter Driver 232 receives the buffer address as a target (or source) of the read (or write) request. I/O Filter Driver 232 checks the buffer for the identifier.

In operation 525, if the I/O Filter Driver 232 detects the identifier, then I/O Filter Driver 232 decodes the signed request and signals the application agent 212 to retry the request. I/O Filter Driver 232 can signal the application agent 212 to retry the request by signaling a failure of the request in return the read (or write) request.

In operation 530, application agent 212 retries the request to the I/O Filter Driver 232 to generate a VFIO snapshot from filter driver records with an identifier and signed request.

In operation 535, when the I/O Filter Driver 232 receives and validates the second (retry) request to generate a VFIO snapshot for the filter records associated with the unique identifier in the request, the I/O Filter Driver 232 generates the VFIO snapshot according to the request. The VFIO snapshot corresponds, substantially, to the SS 245 of the production disks.

In operation 540, I/O Filter Driver 232 signals to the application agent that the VFIO snapshot has been successfully created.

Method 500 ends, and returns to calling method 400 at operation 425, as described above, with reference to FIG. 4.

Figure 6:
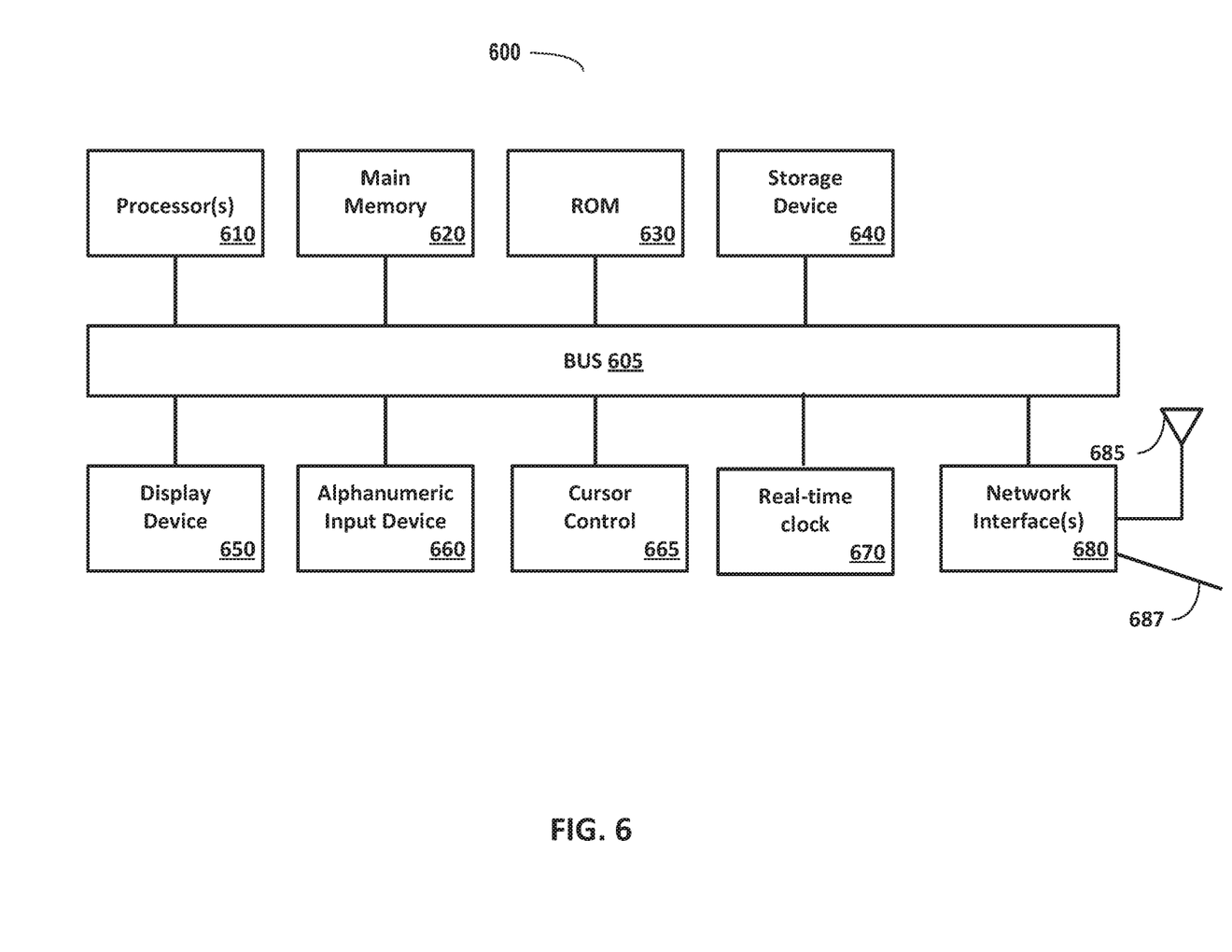
FIG. 6 illustrates, in block diagram form, an example computing system that can perform agent aware selective backup of a virtual machine using virtual filter I/O snapshots, in accordance with some embodiments.

FIG. 6 is a block diagram of one embodiment of a computing system 600. The computing system illustrated in FIG. 6 is intended to represent a range of computing systems (either wired or wireless) including, for example, desktop computer systems, laptop computer systems, cellular telephones, personal digital assistants (PDAs) including cellular-enabled PDAs, set top boxes, entertainment systems or other consumer electronic devices. Alternative computing systems may include more, fewer and/or different components. The computing system of FIG. 6 may be used to provide a computing device and/or a server device.

Computing system 600 includes bus 605 or other communication device to communicate information, and processor 610 coupled to bus 605 to process information.

While computing system 600 is illustrated with a single processor, computing system 600 may include multiple processors and/or co-processors 610. Computing system 600 further may include random access memory (RAM) 630 or other dynamic storage device (referred to as main memory 620), which is coupled to bus 605 and may store information and instructions that may be executed by processor(s) 610. Main memory 620 may also be used to store temporary variables or other intermediate information during execution of instructions by processor 610.

Computing system 600 may also include read only memory (ROM) 630 and/or other static, non-transitory storage device 640 coupled to bus 605 that may store static information and instructions for processor(s) 610. Data storage device 640 may be coupled to bus 605 to store information and instructions. Data storage device 640 such as flash memory or a magnetic disk or optical disc and corresponding drive may be coupled to computing system 600. Any, or all, of memory 620, ROM 630, or data storage device 640 can be programmed with executable instructions that, when executed by processor(s) 610 perform the functionality described herein, including but not limited to, a virtual machine, a host, hypervisor, VM backup proxy 210, I/O filter driver FW 222, I/O filter driver 232, snapshot logic, backup application 262, de-duplication engine 255, and other claimed functionality.

Computing system 600 may also be coupled via bus 605 to display device 650, such as a light-emitting diode (LED) display, or liquid crystal display (LCD), to display information to a user. Computing system 600 can also include an alphanumeric input device 660, including alphanumeric and other keys, which may be coupled to bus 605 to communicate information and command selections to processor(s) 610. Another type of user input device is cursor control 665, such as a touchpad, a mouse, a trackball, or cursor direction keys to communicate direction information and command selections to processor(s) 610 and to control cursor movement on display 650. Computing system 600 may further include a real-time clock 670. The real-time clock 670 may be used for generating date/time stamps for data records, computing elapsed time, and other time-keeping functions. A real-time clock 670 can be a battery-backed chipset with a settable date and time. Alternatively, a real-time clock 670 may include logic to retrieve a real-time from a network source such as a server or an Internet server via network interfaces 680, described below.

Computing system 600 further may include one or more network interface(s) 680 to provide access to a network, such as a local area network. Network interface(s) 680 may include, for example, a wireless network interface having antenna 685, which may represent one or more antenna(e). Computing system 600 can include multiple wireless network interfaces such as a combination of WiFi, Bluetooth® and cellular telephony interfaces. Network interface(s) 680 may also include, for example, a wired network interface to communicate with remote devices via network cable 687, which may be, for example, an Ethernet cable, a coaxial cable, a fiber optic cable, a serial cable, or a parallel cable.

In one embodiment, network interface(s) 680 may provide access to a local area network, for example, by conforming to IEEE 802.11b, 802.11g, or 802.11n standards, and/or the wireless network interface may provide access to a personal area network, for example, by conforming to Bluetooth® standards. Other wireless network interfaces and/or protocols can also be supported. In addition to, or instead of, communication via wireless LAN standards, network interface(s) 680 may provide wireless communications using, for example, Time Division, Multiple Access (TDMA) protocols, Global System for Mobile Communications (GSM) protocols, Code Division, Multiple Access (CDMA) protocols, and/or any other type of wireless communications protocol.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A computer-implemented method of backing up data, performed on a processing system comprising at least one hardware processor, the method comprising:
    quiescing, by an application agent, a state of an application;
    taking a snapshot (SS) of application data;
    generating a virtual filter I/O (VFIO) snapshot from the SS, input/output (I/O) filter records corresponding to the SS, the filter records generated by a filter driver that intercepts I/Os between the application and one or more disks that store the application data;
    releasing the SS and resuming the application;
    performing a backup using the VFIO snapshot; and
    triggering, by the application agent, the filter driver to replace a plurality of filter driver records, corresponding to the VFIO snapshot, with data indicating the application data was backed up using the VFIO snapshot.

2. The method of claim 1, further comprising:
    configuring the filter driver to generate the I/O filter records in accordance with a frequency specified in a backup policy related to the application data.

3. The method of claim 1, wherein the filter driver communicates with a backup agent to perform the backup.

4. The method of claim 1, wherein generating the VFIO snapshot comprises:
    comparing, by the application agent, changed blocks in the SS to filter driver data representing a previous backup, to determine application data blocks in the SS that have changed since the previous backup.

5. The method of claim 1, wherein the application agent communicates with the filter driver via a secure communication channel.

6. The method of claim 1, wherein the filter records are stored on different disks than the application data.

7. The method of claim 1, wherein the application agent causes the filter driver to store the VFIO snapshot with a unique identification number given by the application agent.

8. A non-transitory computer-readable medium programmed with executable instructions that, when executed by a processing system having at least one hardware processor, cause the processing system to perform operations of backing up application data, the operations comprising:
    quiescing, by an application agent, a state of an application;
    taking a snapshot (SS) of application data;
    generating a virtual filter I/O (VFIO) snapshot from the SS, input/output (I/O) filter records corresponding to the SS, the filter records generated by a filter driver that intercepts I/Os between the application and one or more disks that store the application data;
    releasing the SS and resuming the application;
    performing a backup using the VFIO snapshot; and
    triggering, by the application agent, the filter driver to replace a plurality of filter driver records, corresponding to the VFIO snapshot, with data indicating the application data was backed up using the VFIO snapshot.

9. The medium of claim 8, the operations further comprising:
    configuring the filter driver to generate the I/O filter records in accordance with a frequency specified in a backup policy related to the application data.

10. The medium of claim 8, wherein the filter driver communicates with a backup agent to perform the backup.

11. The medium of claim 8, wherein generating the VFIO snapshot comprises:
    comparing changed blocks in the SS to filter driver data representing a previous backup, to determine application data blocks in the SS that have changed since the previous backup.

12. The medium of claim 8, wherein the application agent communicates with the filter driver via a secure communication channel.

13. The medium of claim 8, wherein the filter records are stored on different disks than the application data.

14. The medium of claim 8, wherein the application agent causes the filter driver to store the VFIO snapshot with a unique identification number given by the application agent.

15. A system comprising:
    a processing device; and
    a memory coupled to the processing device programmed with executable instructions that, when executed by the processing device, cause the processing device to perform operations of backing up application data, the operations comprising:

quiescing, by an application agent, a state of an application;

taking a snapshot (SS) of application data;

generating a virtual filter I/O (VFIO) snapshot from the SS, input/output (I/O) filter records corresponding to the SS, the filter records generated by a filter driver that intercepts I/Os between the application and one or more disks, coupled to the processing device, that store the application data;

releasing the SS and resuming the application;

performing a backup using the VFIO snapshot; and triggering, by the application agent, the filter driver to replace a plurality of filter driver records, corresponding to the VFIO snapshot, with data indicating the application data backed up using the VFIO snapshot.

16. The system of claim 15, the operations further comprising:

configuring the filter driver to generate the I/O filter records in accordance with a frequency specified in a backup policy related to the application data.

17. The system of claim 15, wherein the filter driver communicates with a backup agent to perform the backup.

18. The system of claim 15, wherein generating the VFIO snapshot comprises:

comparing changed blocks in the SS to filter driver data representing a previous backup, to determine application data blocks in the SS that have changed since the previous backup.

19. The system of claim 15, wherein the application agent communicates with the filter driver via a secure communication channel.

20. The system of claim 15, wherein the filter records are stored on different disks than the application data.

21. The system of claim 15, wherein the application agent causes the filter driver to store the VFIO snapshot with a unique identification number given by the application agent.

* * * * *

UNITED STATES PATENT AND TRADEMARK OFFICE
CERTIFICATE OF CORRECTION

PATENT NO. : 10,705,756 B2  
APPLICATION NO. : 16/160341  
DATED : July 7, 2020  
INVENTOR(S) : Kedar Patwardhan and Rajesh Nair Page 1 of 1

It is certified that error appears in the above-identified patent and that said Letters Patent is hereby corrected as shown below:

In the Claims

Claim 11, Column 16, Line 48, replace "snapshot" with "snapstho"

Claim 14, Column 16, Line 59, replace "snapshot" with "snapstho"

Signed and Sealed this  
Nineteenth Day of January, 2021

Andrei Iancu  
*Director of the United States Patent and Trademark Office*